US009239610B2

(12) United States Patent
Baram et al.

(10) Patent No.: US 9,239,610 B2
(45) Date of Patent: Jan. 19, 2016

(54) SYSTEMS AND METHODS FOR MANAGING DATA IN A SYSTEM FOR HIBERNATION STATES

(71) Applicants: Yair Baram, Metar (IL); Hanan Borukhov, Rehovot (IL); Idan Alrod, Herzliya (IL); Eran Sharon, Rishon Lezion (IL)

(72) Inventors: Yair Baram, Metar (IL); Hanan Borukhov, Rehovot (IL); Idan Alrod, Herzliya (IL); Eran Sharon, Rishon Lezion (IL)

(73) Assignee: SanDisk Technologies Inc., Plano, TX (US)

( * ) Notice: Subject to any disclaimer, the term of this patent is extended or adjusted under 35 U.S.C. 154(b) by 180 days.

(21) Appl. No.: 13/780,834

(22) Filed: Feb. 28, 2013

(65) Prior Publication Data

US 2014/0245040 A1 Aug. 28, 2014

(51) Int. Cl.
  *G06F 1/00* (2006.01)
  *G06F 1/32* (2006.01)
  *G06F 1/26* (2006.01)

(52) U.S. Cl.
  CPC ............ *G06F 1/3275* (2013.01); *G06F 1/3206* (2013.01); *G06F 1/3246* (2013.01); *G06F 1/26* (2013.01)

(58) Field of Classification Search
  CPC ..................................... G06F 1/26; G06F 1/32
  USPC .................................................. 713/323, 324
  See application file for complete search history.

(56) References Cited

U.S. PATENT DOCUMENTS

| 2005/0086551 | A1* | 4/2005 | Wirasinghe et al. | 713/330 |
|---|---|---|---|---|
| 2005/0216666 | A1* | 9/2005 | Sih et al. | 711/118 |
| 2005/0246487 | A1* | 11/2005 | Ergan et al. | 711/113 |
| 2006/0280019 | A1* | 12/2006 | Burton et al. | 365/226 |
| 2008/0082743 | A1* | 4/2008 | Hanebutte et al. | 711/113 |
| 2008/0082752 | A1* | 4/2008 | Chary et al. | 711/118 |
| 2008/0082873 | A1 | 4/2008 | Russell et al. | |
| 2008/0172519 | A1* | 7/2008 | Shmulevich et al. | 711/103 |
| 2009/0172439 | A1* | 7/2009 | Cooper et al. | 713/323 |
| 2009/0327608 | A1* | 12/2009 | Eschmann et al. | 711/118 |
| 2010/0106994 | A1* | 4/2010 | Challener et al. | 713/330 |
| 2011/0122675 | A1 | 5/2011 | Parkinson et al. | |
| 2011/0231687 | A1 | 9/2011 | Takeyama et al. | |
| 2012/0221843 | A1* | 8/2012 | Bak et al. | 713/100 |
| 2014/0304475 | A1* | 10/2014 | Ramanujan et al. | 711/128 |

* cited by examiner

*Primary Examiner* — Jaweed A Abbaszadeh
*Assistant Examiner* — Phil Nguyen
(74) *Attorney, Agent, or Firm* — Brinks Gilson & Lione

(57) ABSTRACT

The present application is directed to systems and methods for managing data in a system for hibernation states. In one implementation, a memory device comprises a controller memory, a main memory, a buffer to the main memory and a controller comprising a processor. The processor is configured to manage data storage in conjunction with hibernation of the memory device. The processor is in communication with the controller memory, the main memory and the buffer, and is configured to read data from the controller memory; write at least a portion of the data read from the controller memory into the buffer prior to the memory device entering a hibernation state; and after writing the at least a portion of the data read from the controller memory into the buffer and prior to the memory device entering the hibernation state, reduce an amount of power provided to the buffer of the to a reduced power level.

12 Claims, 2 Drawing Sheets

SYSTEMS AND METHODS FOR MANAGING DATA IN A SYSTEM FOR HIBERNATION STATES

BACKGROUND

It is desirable for devices, such as mobile devices, to have the ability to both quickly resume operations from a hibernation state (also known as an idle mode) and to store data for extended periods of time in a hibernation state while consuming small amounts of power. Typically mobile devices include a controller device and a non-volatile storage device. The controller device is comprised of a processing unit and a high performance volatile RAM memory. The storage device may include a flash memory array, (e.g. NAND array), which is a long term non-volatile memory, and a number of buffers and associated circuitry. When the system is awake the buffer will typically be used as an intermediate memory between the controller and the flash array. In programming mode, the buffer will receive data from the controller and the data stored in the buffer will be used to program the flash array. When reading from the flash, a sensing operation will be applied to the flash array, and the results of the sensing will be processed by the associated circuitry and stored in the buffer. The contents of the buffer will then be transferred to the controller for further processing (e.g. ECC decoding). Two options are commonly considered for hibernation. Long period hibernation is typically preceded by copying data from the volatile memories (e.g. the controller RAM) into the non-volatile memory, and shutting the power from the volatile RAM. Short period hibernation may be implemented by reducing the power consumption of the volatile RAM to a minimal level required for maintaining the data. Both methods have their advantages and disadvantages. Shutting down all the volatile memory has the ability to withstand long hibernation periods, but results in a long wake up period, when the mobile device becomes active again. Reducing the power to the RAM enjoys a fast wake up time but the RAM continues to draw power from the device, and therefore it may be used for a limited time only.

Improved hibernation methods are desirable for use in devices such as mobile devices that are able to provide the speed of memory such as with DRAM memory, while providing the ability to store data for extended periods of time while consuming small amounts of power such as with NAND memory.

SUMMARY

The present disclosure is directed to systems and methods for managing data in a system for hibernation. In one aspect, a method for managing data storage in conjunction with hibernation of a system is disclosed. The elements of the method occur in a controller of a memory device, the memory device comprising a controller memory and a storage device which includes a main non-volatile memory (e.g. a flash memory array), a buffer to the main non-volatile memory, and circuitry associated with the buffer. The buffer and associated circuitry may be considered as a volatile memory, but their power consumption is less than the controller memory. The controller reads data from the controller memory and writes a least a portion of the data read from the controller memory into the buffer of the memory device prior to the system entering a hibernation state. After writing the at least a portion of the data read from the controller memory into the buffer of the memory device and prior to the system entering the hibernation state, the controller reduces an amount of power provided to the buffer of the memory device to a reduced power level in order to conserve power during the hibernation state. Additionally, the controller may shut down the power to the controller memory.

In some implementations, the controller determines the reduced power level based on an error correction code associated with the at least a portion of the data stored in the buffer of the memory device during the hibernation state.

In another aspect, a memory device is disclosed. The memory device comprises a controller memory, a main non-volatile memory, a buffer to the main non-volatile memory, and a controller comprising a processor. The processor is configured to manage data storage in conjunction with hibernation of the memory device. The processor is in communication with the controller memory, the buffer, and the main non-volatile memory, and is configured to read data from the controller memory; write at least a portion of the data read from the controller memory into the buffer prior to the memory device entering a hibernation state; and after writing the at least a portion of the data read from the controller memory into the buffer and prior to the memory device entering the hibernation state, reduce an amount of power provided to the buffer of the to a reduced power level to conserve power during the hibernation state. The controller may also be configured to shut down the power to the controller memory.

In some implementations, the processor is further configured to determine the reduced power level based on an error correction code associated with the at least a portion of the data stored in the buffer of the memory device during the hibernation state.

DETAILED DESCRIPTION OF THE DRAWINGS

The present disclosure is directed to systems and methods for managing data in a system for hibernation states. As discussed in more detail below, a system may include two types of memory devices. A first memory of the system, such as controller memory, may have properties such as fast write and read times. A second memory of the system, such as a main non-volatile memory that may be a flash array, may have properties such as being able to store data for extended periods of time while consuming small amounts of power. When the system is awake both the controller memory and the main non-volatile memory are used and active. However, when the system enters a hibernation state, a controller of the system may perform operations to utilize the first and second memories in a different manner than while the system is awake.

When the system enters a hibernation state, the controller may utilize different portions of a memory device based on an amount of time that the system may be in the hibernation state. For example, the controller may utilize a volatile buffer of the memory device for short hibernation periods and utilize the main non-volatile memory of the memory device for longer hibernation periods.

Additionally, when the controller utilizes the buffer of the memory device for short hibernation periods, the controller may reduce a power level to the buffer during the hibernation period in order to conserve power. The controller may further shut down the power to the first memory (the controller memory). In some implementations, the controller may take advantage of an error correction code associated with the data stored in the buffer so that even though reducing a power level of the buffer may introduce errors into the data, the error correction code may correct the errors when the data is read from the buffer after the system awakes from the hibernation state.

Shifting data between first and second memories allows the system to quickly perform operations while awake and to store data for extended periods of time with small power consumption while the system is in a hibernation state.

Figure 1:
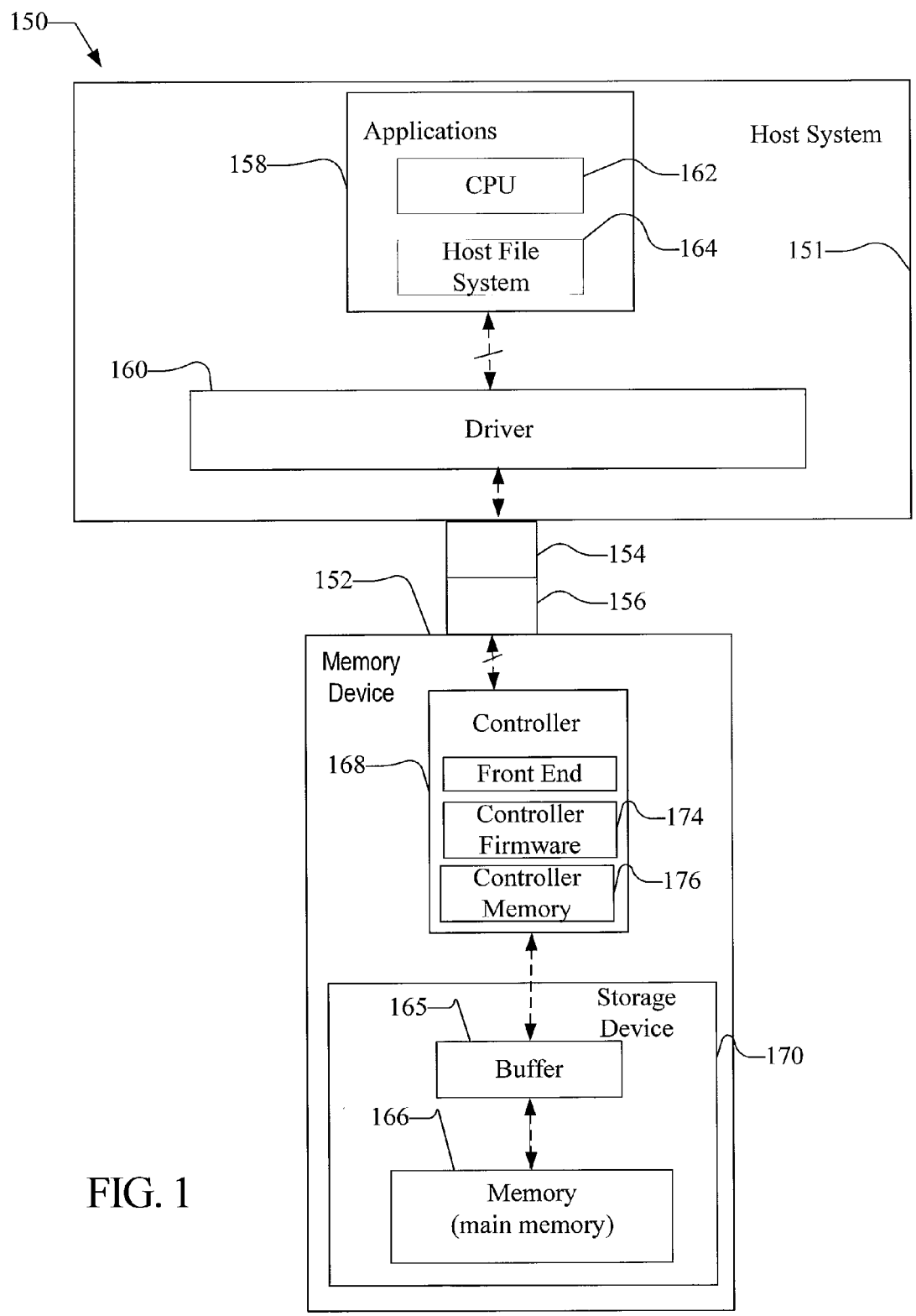
FIG. 1 is a block diagram of one implementation of a system suitable for managing data for hibernation states.

An implementation of a system a system 150 suitable for use in implementing aspects of the invention is shown in FIG. 1. The system 150 includes a host system 151 configured to store data into and retrieve data from a memory device 152. The memory device 152 may be memory embedded within the system 150, such as in the form of a solid state disk (SSD) drive installed in a personal computer. Alternatively, the memory devices 152 may be in the form of a card that is removably connected to the host through mating parts 154 and 156 of a mechanical and electrical connector as illustrated in FIG. 1. A memory configured for use as an internal or embedded SSD drive may look similar to the schematic of FIG. 1, with the primary difference being the location of the memory device 152 internal to the host. SSD drives may be in the form of discrete modules that are drop-in replacements for rotating magnetic disk drives.

The host system 151 of FIG. 1 may be viewed as having two major parts, in so far as the memory device 152 is concerned, made up of a combination of circuitry and software. They are an applications portion 158 (a controller) and a driver portion 160 that interfaces with the memory device 152. In a PC, for example, the applications portion 158 can include a processor 162 running word processing, graphics, control or other popular application software, as well as the file system 164 for managing data on the host 151. In a camera, cellular telephone or other host system that is primarily dedicated to perform a single set of functions, the applications portion 158 includes the software that operates the camera to take and store pictures, the cellular telephone to make and receive calls, and the like.

The memory device 152 of FIG. 1 may include a storage device 170 and a memory controller 168. The storage device 170 may include a buffer 165 and a non-volatile memory 166. The memory controller 168 controls the storage device 170 and may interface with the host 151 to which the memory device is connected for passing data back and forth. The memory controller 168 may be implemented using a hardware CPU processor and may convert between logical addresses of data used by the host 151 and physical addresses of the memory 166 during data programming and reading. The memory controller 168 may also be used for encoding and decoding and other functions related to the processing of data. Functionally, the memory controller 168 may include a front end 172 that interfaces with the host system; controller logic 174 for coordinating operation of the storage device 170 including the buffer 165 and the memory 166; and controller memory 176 that the controller 168 utilizes during operation.

As explained in more detail below, when the system prepares to enter a hibernation state, the controller 168 of the memory device 152 and/or the controller 158 of the host system 151 may be configured to control whether data stored in the controller memory 176 is shifted to the buffer 165 of the memory device 152 or the memory 166 of the memory device 152 prior to the system 150 entering a hibernation state. In some implementations, the controller 168 of the memory device 152 and/or the controller 158 of the host system 151 shifts data from the controller memory 176 to the memory 166 of the memory device 152 when the system 150 will be in a hibernation state for an extended period of time. However, when the system 150 will be in a hibernation state for a relatively short period of time, the controller 168 of the memory device 152 and/or the controller 158 of the host system 151 shifts data form the controller memory 176 to the buffer 165 of the memory device 152.

When the controller 168 of the memory device 152 and/or the controller 158 of the host system 151 shifts data from the controller memory 176 to the buffer 165 of the memory device 152, the controller 168 of the memory device 152 and/or the controller 158 of the host system 151 may be further configured to reduce an amount of power supplied to the buffer 165 of the memory device 152 during hibernation in order to conserve power. The controller 168 of the memory device 152 and/or the controller 158 of the host system 151 may also shut down the power to the controller memory 176. In some implementations, the controller may take advantage of an error correction code associated with the data stored in the buffer 165 so that even through reducing a power level of the buffer 165 may introduce errors into the data, the controller may utilize the error correction code to correct the errors when the data is read from the buffer 165 after the system 150 awakes from the hibernation state.

In some implementations, the controller stores an entire image of the data stored in the controller memory 176 in the non-volatile main memory 166 or the buffer 165 of the non-volatile main memory device 166. However, in other implementations, the controller only stores a portion of the data stored in the controller memory 176 in the non-volatile main memory 166 or the buffer 165 of the non-volatile main memory device 166. Examples of systems and methods that may be utilized to determine a sub portion of data stored in the controller memory 176 to store in the main non-volatile memory 166 or the buffer 165 of the non-volatile main memory 166 are taught in U.S. patent application Ser. No. 13/330,185, filed Dec. 19, 2011, the entirety of which is hereby incorporated by reference.

Figure 2:
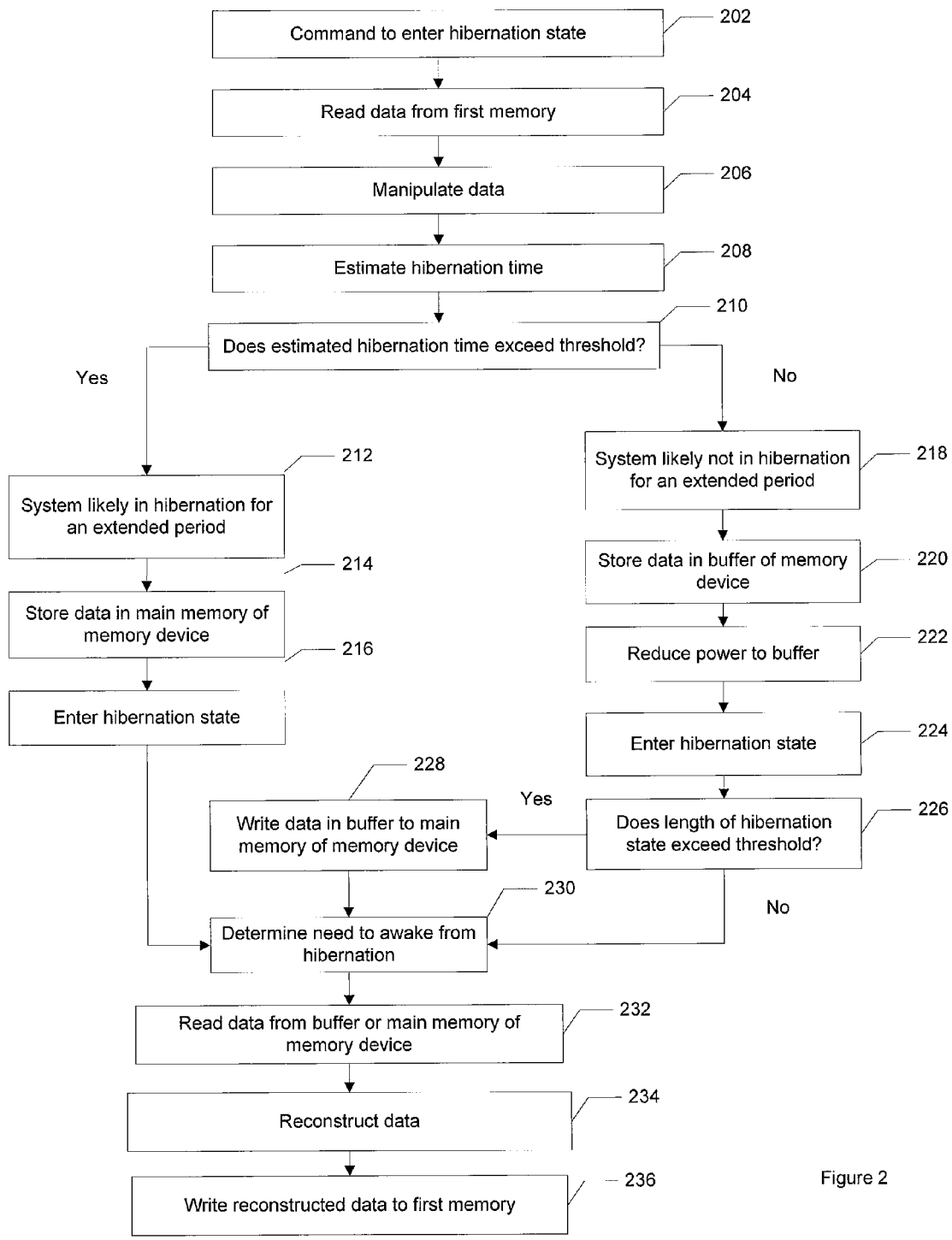
FIG. 2 is a flow chart of one implementation of a method for managing data within a system before and after the system enters a hibernation state.

FIG. 2 is a flow chart of one implementation of a method for managing data within a system before and after the system enters a hibernation state. The method begins at step 202 with a controller determining a need for the system to enter a hibernation state. The controller may be implemented through a controller on a host system, a controller on a memory device, or a combination of operations between a controller on a host system and a controller on a memory device. It will be appreciated that the controller may determine the need for the system to enter a hibernation state based on a signal received from a user actuating a button on the system, an amount of time since a last operation by the system, and/or any other factor that may alert the controller to a need to enter a hibernation state.

At step 204, the controller reads data from a first memory. In some implementations, the first memory may be memory such as a DRAM memory device or RAM memory of a controller. At step 206, the controller may manipulate the data read from the first memory by performing operations such as compressing the data to reduce the size of the data or shaping the data to reduce wear on memory. In some implementations, to shape the data, the controller may transform the bit sequence of the data to reduce a number of zeros making up the bit sequence so that an increased number of memory cells may remain in an erased state. Examples of algorithms that may be utilized to shape the data are described in U.S. Pat. No. 7,984,360, issued Jul. 19, 2011; U.S. Provisional Patent App. No. 61/549,448, filed Oct. 20, 2011; and U.S. Provisional Patent App. No. 61/550,694, filed Oct. 24, 2011, the entirety of each of which are hereby incorporated by reference.

At step 208, the controller may estimate an amount of time that the system will be in a hibernation state. In some implementations, the controller estimates an amount of time that the system will be in a hibernation state based on an amount of charge in a battery of the system, an analysis of previous hibernation states of the system, and/or any other factor that my indicate to the controller an estimated amount of time that the system will be in a hibernation state.

At step 210, the controller determines whether the estimated amount of time that the system will be in a hibernation state exceeds a threshold. In some implementations, the controller may dynamically determine the threshold based on factors such as whether or not the system is receiving power from a battery; a power level associated with a battery of the system; and/or any other factor that may indicate to a controller that it would be more beneficial to the system to store data from a first memory in a second memory of a memory device while the system is in a hibernation state rather than to store the data from the first memory in a buffer of the second memory of the memory device. If the controller determines at step 210 that the estimated amount of time exceeds the threshold, the controller determines at step 212 that the system will likely be in a hibernation state for an extended period of time. At step 214, the controller stores at least a portion of the data from the first memory in a second memory. At step 216, the system enters a hibernation state.

In implementations such as those illustrated in FIG. 1, the first and second memories are positioned within the same memory device, such as in a NAND memory device. In such implementations, for example, the first memory may be memory of the memory device controller and the second memory may be the main memory of the memory device. Accordingly, data is shifted from the controller memory of the memory device to the main memory of memory device prior to the system entering a hibernation state.

Referring again to step 210, if the controller determines at step 210 that the estimated amount of time does not exceed the threshold, the controller determines at step 218 that the system will likely not be in a hibernation state for an extended period of time. At step 220, the controller stores at least a portion of the data read from the first memory in a buffer of a memory device. Those of skill in the art will appreciate that it requires less power to store data in a buffer of a memory device than in the controller memory. Those of skill in the art will additionally appreciate that while it requires more power to store data in the buffer of the memory device than the main memory of the memory device, it takes longer for the system to retrieve data from the main memory of the memory device when awaking from a hibernation state than it takes the system to retrieve data from the buffer of the main memory of the memory device when awaking from a hibernation state.

After storing the data in the buffer of the memory device, at step 222, the controller may reduce an amount of power provided to the buffer of the memory device to a reduced power level in order to conserve power during a hibernation state. At step 222, the controller may also shut down the power to the controller memory in order to conserve power during the hibernation state. In some implementations, the controller may determine the reduced power level based on an error correction code associated with the at least a portion of the data stored in the buffer of the memory device. For example, the controller may determine that the power to the buffer may be reduced to a level such that even though the reduced power level may introduce errors into the data stored in the buffer of the memory device, the number of errors introduced to the data are within the number of errors that the error correction code may correct when the data is read from the buffer. At step 224, the system enters a hibernation state.

In implementations such as those illustrated in FIG. 1, the first memory and the buffer of the memory device are located in the same memory device. In such implementations, for example, the first memory may be memory of a controller of the memory device and the buffer may be a buffer of the main memory of the same memory device. Accordingly, data is shifted from the controller memory of the memory device to the buffer of the memory device prior to the system entering a hibernation state.

At step 226, the controller monitors the length of the hibernation state. When the controller determines that the length of the hibernation state exceeds a threshold, at step 228, the controller writes the at least a portion of the data stored in the buffer of the memory device in the second memory of the memory device, which may be the main memory of the memory device.

In some implementations, the threshold may be a predetermined amount of time that does not change and that is determined prior to the system entering a hibernation state. However, in other implementations, the controller may dynamically determine the threshold based on factors such as amount of data stored in the buffer of the memory device; whether or not the system is receiving power from a battery; a power level associated with a battery of the system; and/or any other factor that may indicate to a controller that it would be more beneficial to the system to store the data from the first memory in the second memory while the system is in a hibernation state rather than to store the data from the first memory in the buffer of the memory device. The controller may dynamically determine the threshold prior to the system entering a hibernation state or after the system has entered a hibernation state.

Further, it will be appreciated that in some implementations, the threshold used at step 228 is the same threshold used at step 210. However, in other implementations, the threshold used at step 210 and the threshold used at step 228 are different.

At step 230, the controller determines a need to awake from the hibernation state. It will be appreciated that the controller may determine the need to awake from the initial hibernation state based on a signal received from a user actuating a button on the system, and/or any other factor that may alert the controller to a need to awake from the hibernation state.

In response, at step 232, the controller reads from the second memory or the buffer of the memory device the at least a portion of data originally read from the first memory. It will be appreciated that when the data is stored in the second memory pursuant to steps 214 and 228, the controller reads the data at step 232 from the second memory. However, when the data is stored in the buffer of the memory device pursuant to step 220 and the system awakes before the controller moves the data from the buffer of the memory device to the second memory, the controller reads the data at step 232 from the buffer of the memory device.

At step 234, the controller manipulates the data to reverse any operations that may have been performed on the data at step 206 and reconstructs the data originally read from the first memory at step 204. In some implementations, the controller may reconstruct the data originally read from the first memory based on the data read from the second memory or buffer at step 232 and an error correction code associated with the data read from the second memory or buffer. At step 236, the controller then stores in the first memory the reconstructed data to restore the contents of the first memory.

After storing the reconstructed data in the first memory, the system may perform normal operations where the controller writes data to, and reads data from, the first memory. These operations may continue until a controller determines a need to enter a subsequent hibernation state.

FIGS. 1 and 2, and the accompanying description, describe systems and methods for managing data in a system for hibernation states. As discussed above, a system may include two types of memories having different properties. In order to utilize the advantages of the two types of memory, a controller may perform operations to utilize a first memory and a second memory while the system is awake and utilize the second memory or a buffer of the second memory to store data previously stored in the first memory while the system is in a hibernation state. For example in some implementations, a host controller and/or a memory controller may perform operations to utilize a controller memory, a main non-volatile memory such as flash memory, and a buffer of the main non-volatile memory while the system is awake, and utilize the main non-volatile memory or the buffer of the main non-volatile memory to store data previously stored in the controller memory while the system is in a hibernation state.

In order to more efficiently manage power within the system, when the controller estimates that the system will be in a hibernation state for an extended period of time, the controller may store data from a first memory in a second memory, which may be a main memory of a memory device. However, when the controller estimates that the system will not be in a hibernation state for an extended period of time, the controller may store data from a first memory in a buffer of the memory device.

When the controller stores data from the first memory in the buffer of the memory device, the controller may additionally reduce a power level to the buffer in order to conserve power during a hibernation state. In some implementations, the controller may take advantage of an error correction code associated with the data so that even through reducing a power level of the buffer may introduce errors into the data, the error correction code may correct the errors when the data is read from the buffer after the system awakes from the hibernation state.

It is intended that the foregoing detailed description be regarded as illustrative rather than limiting, and that it be understood that it is the following claims, including all equivalents, that are intended to define the spirit and scope of this invention.

The invention claimed is:

1. A method for managing data storage in conjunction with a hibernation of a system, the method comprising:
   in a controller of a memory device, the memory device comprising a controller memory, a main memory and a buffer to the main memory:
   reading data from the controller memory;
   writing at least a portion of the data read from the controller memory into the buffer of the memory device prior to the system entering a hibernation state;
   after writing the at least a portion of the data read from the controller memory into the buffer of the memory device and prior to the system entering the hibernation state, reducing an amount of power provided to the buffer of the memory device to a reduced power level, wherein the reduced power level is determined based on an error correction code associated with the at least a portion of the data stored in the buffer of the memory device; and
   after waking the system from the hibernation state:
   reading the at least a portion of the data from the buffer of the memory device;
   reconstructing the data based on the at least a portion of the data read from the buffer of the memory device and the error correction code associated with the at least a portion of the data; and
   writing the reconstructed data to the controller memory.

2. The method of claim 1, wherein the memory device comprises flash memory.

3. A method for managing data storage in conjunction with a hibernation of a system, the method comprising:
   in a controller of a memory device, the memory device comprising a controller memory, a main memory and a buffer to the main memory:
   reading data from the controller memory;
   writing at least a portion of the data read from the controller memory into the buffer of the memory device prior to the system entering a hibernation state;
   after writing the at least a portion of the data read from the controller memory into the buffer of the memory device and prior to the system entering the hibernation state, reducing an amount of power provided to the buffer of the memory device to a reduced power level;
   after the system enters the hibernation state:
   determining that an amount of time that the system has been in the hibernation state exceeds a threshold; and
   writing the at least a portion of the data stored in the buffer of the memory device to the main memory of the memory device in response to determining that the amount of time that the system has been in the hibernation state exceeds the threshold; and
   after waking the system from the hibernation state:
   reading the at least a portion of the data from the main memory of the memory device;
   reconstructing the data based on the at least a portion of the data read from the main memory of the memory device; and
   writing the reconstructed data to the controller memory.

4. The method of claim 3, further comprising:
   dynamically determining the threshold based on a power consumption associated with storing the at least a portion of the data in the buffer of the memory device.

5. The method of claim 4, wherein the threshold is determined prior to the system entering the hibernation state.

6. A method for managing data storage in conjunction with a hibernation of a system, the method comprising:
   in a controller of a memory device, the memory device comprising a controller memory, a main memory and a buffer to the main memory, prior to the system entering a hibernation state:
   reading data from the controller memory;
   writing at least a portion of the data read from the controller memory into the buffer of the memory device;
   estimating that an amount of time that the system will be in the hibernation state exceeds a threshold;
   writing the at least a portion of the data stored in the buffer of the memory device to the main memory of the memory device in response to determining that the amount of time that the system will be in the hibernation state exceeds the threshold; and
   after writing the at least a portion of the data read from the controller memory into the main memory, reducing an amount of power provided to the buffer of the memory device to a reduced power level.

7. A memory device comprising:
a controller memory;
a main memory;
a buffer to the main memory;
a controller comprising a processor, the processor configured to manage data storage in conjunction with hibernation of the memory device, the processor in communication with the controller memory, the buffer, and the main memory, the processor configured to:
　read data from the controller memory;
　write at least a portion of the data read from the controller memory into the buffer prior to the memory device entering a hibernation state;
　after writing the at least a portion of the data read from the controller memory into the buffer and prior to the memory device entering the hibernation state, reduce an amount of power provided to the buffer of the to a reduced power level, wherein the reduced power level is determined based on an error correction code associated with the at least a portion of the data stored in the buffer; and
　after waking the memory device from the hibernation state:
　　read the at least a portion of the data from the buffer;
　　reconstruct the data based on the at least a portion of the data read from the buffer of the memory device and the error correction code associated with the at least a portion of the data; and
　　write the reconstructed data to the controller memory.

8. The memory device of claim 7, wherein the main memory comprises flash memory.

9. A memory device comprising:
a controller memory;
a main memory;
a buffer to the main memory;
a controller comprising a processor, the processor configured to manage data storage in conjunction with hibernation of the memory device, the processor in communication with the controller memory, the buffer, and the main memory, the processor configured to:
　read data from the controller memory;
　write at least a portion of the data read from the controller memory into the buffer prior to the memory device entering a hibernation state;
　after writing the at least a portion of the data read from the controller memory into the buffer and prior to the memory device entering the hibernation state, reduce an amount of power provided to the buffer of the to a reduced power level;
　after the memory device enters the hibernation state:
　　determine that an amount of time that the memory device has been in the hibernation state exceeds a threshold; and
　　write the at least a portion of the data stored in the buffer to the main memory in response to determining that the amount of time that the memory device has been in the hibernation state exceeds the threshold; and
　after waking the memory device from the hibernation state:
　　read the at least a portion of the data from the main memory;
　　reconstruct the data based on the at least a portion of the data read from the main memory; and
　　write the reconstructed data to the controller memory.

10. The memory device of claim 9, wherein the processor is further configured to:
dynamically determine the threshold based on a power consumption associated with storing the at least a portion of the data in the buffer.

11. The memory device of claim 10, wherein the processor is configured to determine the threshold prior to the memory device entering the hibernation state.

12. A memory device comprising:
a controller memory;
a main memory;
a buffer to the main memory;
a controller comprising a processor, the processor configured to manage data storage in conjunction with hibernation of the memory device, the processor in communication with the controller memory, the buffer, and the main memory, the processor configured to, prior to the memory device entering a hibernation state:
read data from the controller memory;
write at least a portion of the data read from the controller memory into the buffer;
estimate that an amount of time that the memory device will be in the hibernation state exceeds a threshold;
write the at least a portion of the data stored in the buffer to the main memory in response to determining that the amount of time that the memory device will be in the hibernation state exceeds the threshold; and
after writing the at least a portion of the data read from the controller memory into the main memory, reduce an amount of power provided to the buffer to a reduced power level.

\* \* \* \* \*